May 6, 1947.   A. R. LONG ET AL   2,420,085
CONVEYOR
Filed Jan. 5, 1945   3 Sheets-Sheet 1
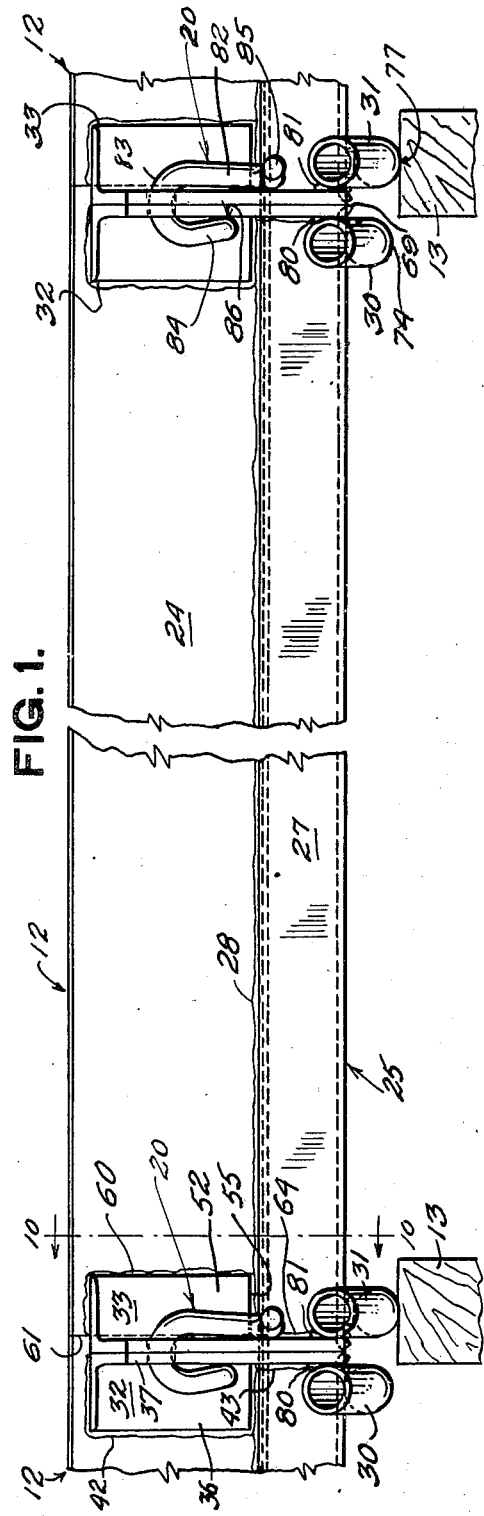
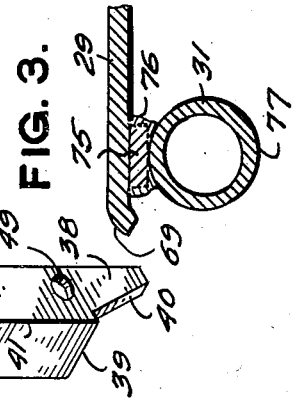
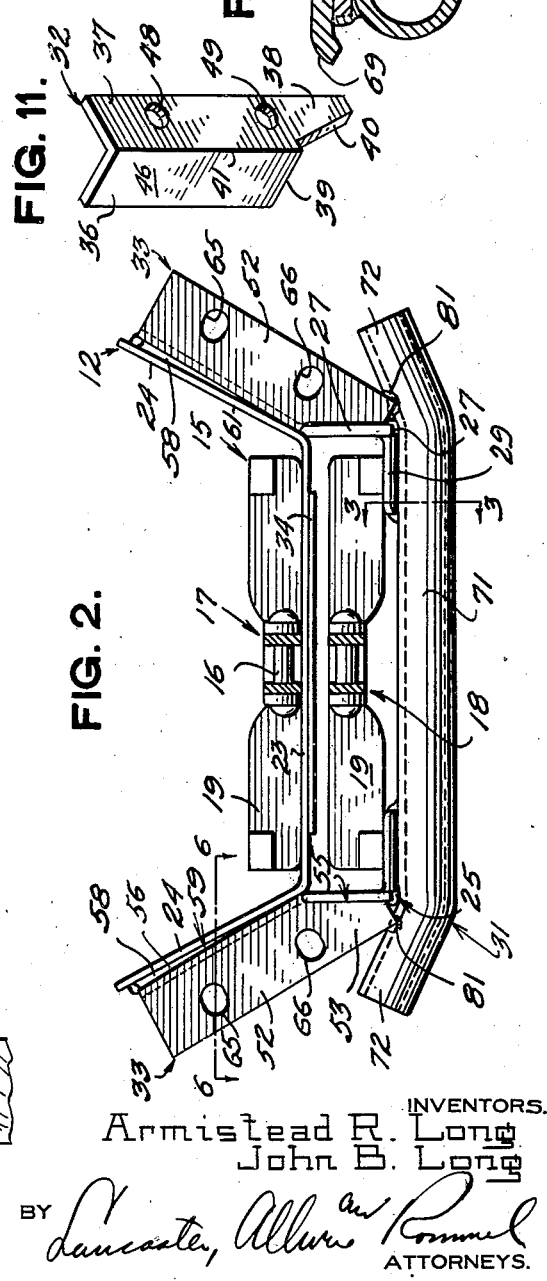
INVENTORS.
Armistead R. Long
John B. Long
BY Lancaster, Allwine and Rommel
ATTORNEYS.

May 6, 1947. A. R. LONG ET AL 2,420,085
CONVEYOR
Filed Jan. 5, 1945 3 Sheets-Sheet 2
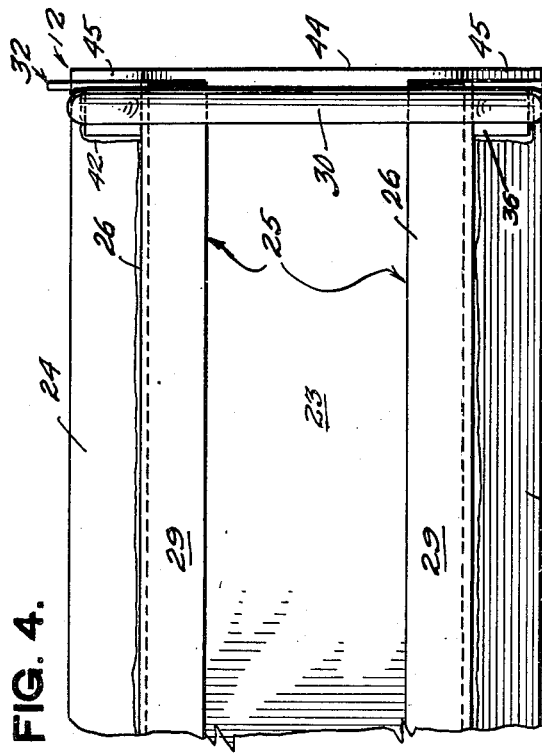
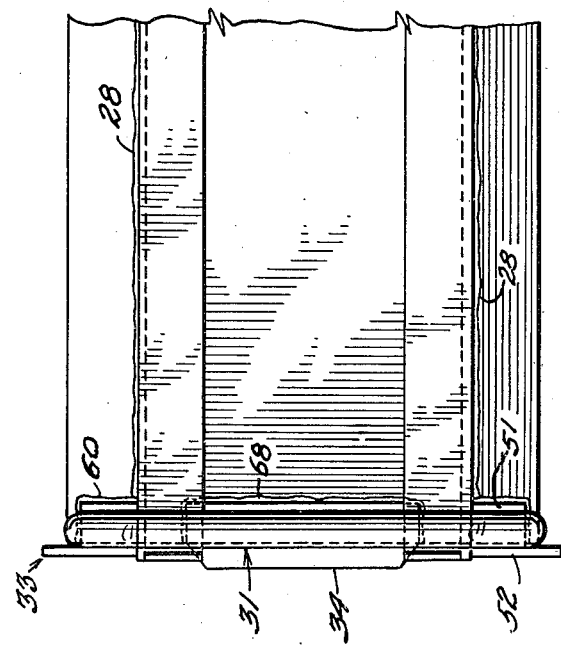
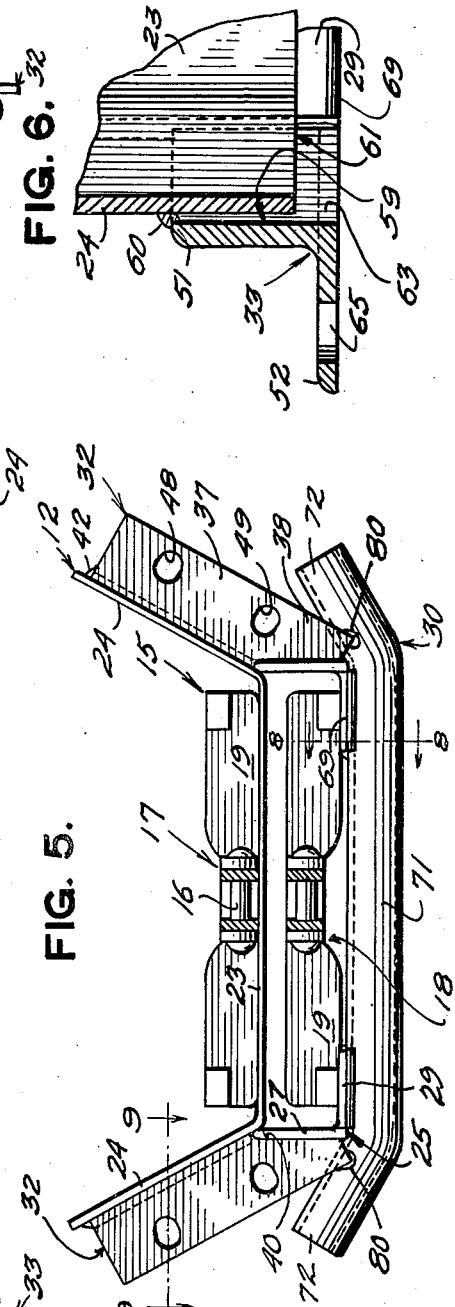
INVENTORS
Armistead R. Long
John B. Long
BY Lancaster, Allwine Rommel
ATTORNEYS.

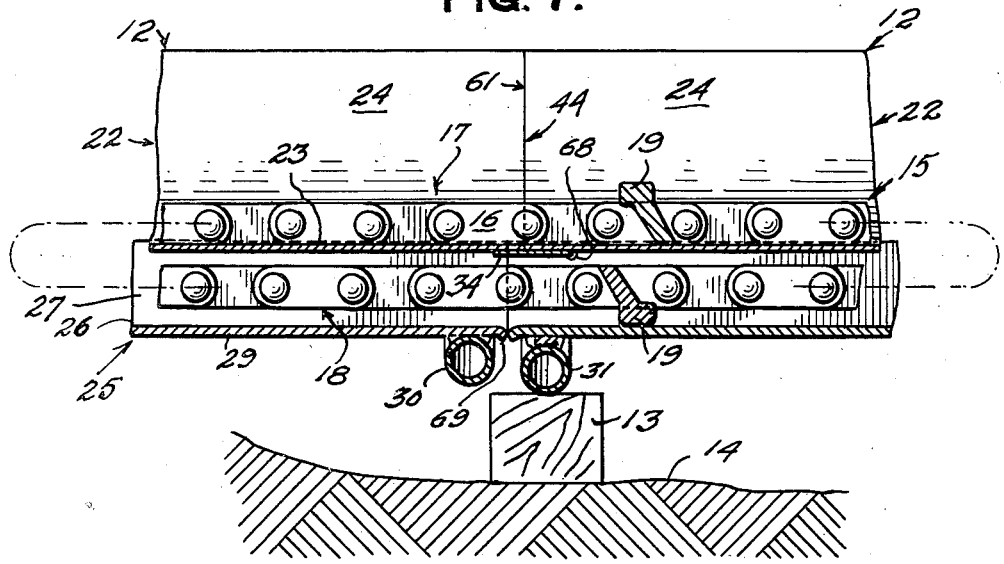
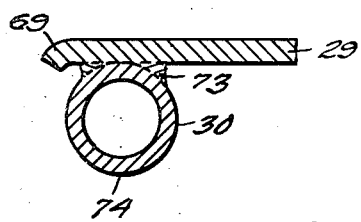
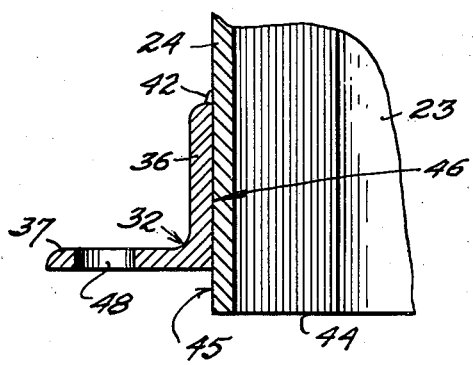
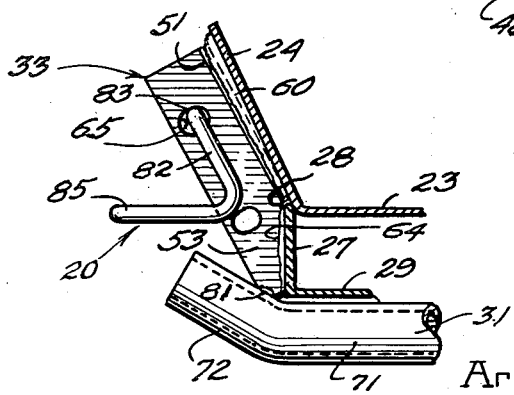

Patented May 6, 1947

2,420,085

UNITED STATES PATENT OFFICE 2,420,085

CONVEYOR

Armistead R. Long, Fayetteville, W. Va., and John B. Long, United States Navy, Washington, D. C.

Application January 5, 1945, Serial No. 571,428

13 Claims. (Cl. 198—204)

The present invention relates to conveyors of the character using endless chains and flights for moving material in trough sections. Such conveyors are generally known as "chain conveyors" and each usually comprises a head end or delivery section including a power unit, a tail or material receiving section, and one or more intermediate trough sections. In practice, especially when used in the mining of coal, the conveyors are frequently dismembered for removal to another mine working, or two or more of the sections separated, as the removal of coal progresses, for the purpose of adding one or more intermediate trough sections, the sections being again coupled and put into operation. The situs of operation of the conveyors is often a chamber having a low ceiling and rough floor, so the trough sections must frequently be pulled or shoved in the chamber or other cramped quarters. The sections are therefore often subjected to rough handling and must frequently be "blocked-up" to fairly align the various sections, as where there are depressions in the floor.

Heretofore it has been the practice to weld or otherwise secure at least two skids extending transversally of each trough section at the bottom thereof, somewhat remote from the ends of the section, and in the same horizontal plane, that is, simply welding them in surface contact with the underside of the trough section stringers or angles, which are used to support the moving flights of the return run of the conveyor chain. This construction and arrangement has several disadvantages among which may be mentioned, first, the necessity for frequently "blocking-up" both adjacent skids to get the adjacent trough sections fairly aligned, second, the difficulty often encountered in aligning the meeting ends of adjacent trough sections, with the skids so remote from such ends, and third, the lack of protection at the ends of the stringers, and particularly the flanges thereof, which act as a track upon which the returning flights slide. Any flange of the stringer which is bent upwardly, say as a result of rough handling, presents an obstruction to sliding movement of the flights and may result in breakage or excessive wear.

One of the principal objects of the present invention is to avoid these objectionable features, by securing the skids at, or near, the extreme ends of trough section, so that the skids at adjacent ends of meeting trough sections are close together, where a single block may be used for "blocking-up" and where the skids afford protection for the flight supporting flanges of the stringers and serve as hand holds or hand rails to facilitate manual transportation, and pushing or pulling of the trough sections into place.

In assembling a conveyor, according to the present invention, the skids at the meeting ends of trough sections are so close together that it is impossible for a workman to leave a flight below the stringers of the trough sections, as happens at times, when the skids are remote from the ends of the trough sections. This fault in assembling a conveyor, that is, leaving a flight of the chain below the stringers results in serious damage to the conveyor, when motion is transmitted to the chain, by the flight encountering one of the skids. It will therefore be seen that the novel arrangement of skids according to the present invention has many advantages.

Another object of the invention is to secure the skids to the ends of the trough sections in such manner as to facilitate assembly of the sections and guard against accidental loosening of the bolts or other fastening means used to connect the sections, thereby avoiding damage to the conveyor chain and its flights. This is accomplished by securing the skids, one to each end of the trough section, with the lower surface of the skid that is adjacent the seat of the trough upon which the trough of the adjacent section rests, spaced a much greater distance below the track upon which the returning flights slide, than the spacing of the lower surface of the other skid below said track. This, among other things, facilitates assembly of the conveyor, especially on a rough floor, in that, technically speaking, the trough section may be said to have one point ground support at the lower skid, the other end being supported by the adjacent trough section. This is important since care need not be exercised in placing blocks under both adjacent skids, for alignment of the trough sections, or to relieve the strain on the bolts or other fastening means used to connect the sections. Also this is in contradistinction to the conventional conveyor section construction, where the skids are remote from the ends thereof and in the same plane, for unless extreme care is exercised in the use of blocks under both adjacent skids, for proper alignment of the troughs before coupling them together, considerable force is required to couple the sections, and the vibration and strain upon the coupling means is apt to loosen same, with consequent misalignment and damage to the conveyor chain and its flights. If there is not this proper "blocking-up" of the conventional trough sections, one section may act like a cantilever (acting on its skid as a fulcrum), upon the coupling of the sections, causing excessive wear, vibration and loosening of the coupling.

A further object of the invention is to provide coupling angles for the sections, of conveyors, such as the head end, tail section and intermediate trough sections, which may be accurately made and assembled with respect to parts of the sections and more firmly secured, as by welding, to such parts so as to give greater support. As an example, the coupling angles, according to the present invention, may be cut from stock metal angle material to the desired contour for assembly with parts of the conveyor sections, thus avoiding the bending of the metal (as is common practice in providing coupling angles) and also providing edges for the weld where such is most effective for support, and to resist pulling away from the section body when subjected to tension.

Other objects and advantages of the invention will appear in the following detailed description of the preferred embodiment of our invention, taken in connection with the accompanying drawings, forming a part of this specification, and in which drawings:

Fig. 1 is a fragmentary view in elevation of portions of trough sections of a conveyor, constructed according to the present invention.

Fig. 2 is an end elevation of one of the trough sections looking toward a flanged or seat end thereof, and showing flights carried thereby and the conveyor chain in cross section.

Fig. 3 is an enlarged detail sectional view on the line 3—3 of Fig. 2.

Fig. 4 is a fragmentary bottom plan view of one of the trough sections.

Fig. 5 is a view similar to Fig. 2, but showing the opposite end of the trough section.

Fig. 6 is an enlarged detail sectional view on the line 6—6 of Fig. 2.

Fig. 7 is a fragmentary vertical sectional view longitudinally of two trough sections at the meeting ends thereof taken in front of the conveyor chain and transversally thru flights on the chain.

Figs. 8 and 9 are enlarged detail sectional views on the lines 8—8 and 9—9, respectively, of Fig. 5.

Fig. 10 is a fragmentary sectional view on the line 10—10 of Fig. 1.

Fig. 11 is a perspective view of a coupling angle.

In the drawing we disclose trough sections 12 having like characteristics, shown supported, as in Figs. 1 and 7, by blocks 13 resting upon the ground 14; means 15 for moving material in the trough sections and in the example shown, comprising an endless chain 16, having an upper run 17 and a lower run 18, and flights 19 carried by and extending to each side of the chain; and means 20 for detachably connecting the trough sections.

In the example shown, each trough section 12 comprises an elongate trough 22, preferably made of sheet metal and bent to provide a bottom 23 and upwardly and outwardly diverging side walls 24, the bottom 23 to support the upper run 17 of the chain and its flights; means 25 below the trough for movably supporting the lower run 18 of the chain and its flights, said means 25 in the example shown comprising opposite stringers 26, each of angle cross section and disposed so that its one flange 27 is vertical and acts as a side wall, and secured as by weld 28 to its respective side of trough 22 at or adjacent the juncture of the bottom 23 and side wall 24 thereof, and its other flange 29 horizontal and directed toward its companion stringer, the flanges 29 acting as a track for the flights of lower run 18; skids 30 and 31 secured to the underside of means 25 transversally of the trough section; coupling members 32 at one end portion of the trough section; coupling members 33 at the other end portion of the trough section, which also act as a seat for a companion trough section; and a horizontal flange 34 carried by the bottom 23 at the end of the trough section where said coupling members 33 are located, this flange 34 also acting as a seat for the companion trough section.

Nothing novel is claimed for the means 15, merely a conventional endless chain 16 and flights 19 being shown by way of example.

While we have shown specific means 20 for cooperating with companion coupling members 32 and 33, it is not claimed specifically in this application, since suitable nuts and bolts, not shown in the drawings, may be used if desired.

The main characteristics of the invention reside in the location of the skids 30 and 31, the location of the coupling members 32 and 33 and the formation of the preferred form of said coupling members and their attachment to the trough 22 and other parts of the unit.

Referring now to the coupling members 32, they are preferably cut from rolled metal angle stock, to provide a minor attaching wing or flange 36 and a major outstanding coupling wing or flange 37, the latter having a portion 38 extending below the lower margin 39 of the minor wing. The rear edge 40 of the extension 38 is cut at an angle, as shown in Fig. 11, to the juncture line 41 between the wings 36 and 37, so that it may engage the wall 27 of the lower track 25 as shown in Fig. 5.

The coupling members 32 are secured, as by welds 42, to the trough, and to the walls 27, as by welds 43, at one end portion of the trough section, but slightly spaced from the end 44 of the trough 22 whereby a downwardly facing slender area 45 of the side wall is exposed between the end of the trough and the coupling member, as shown in Fig. 4. As illustrated more particularly in Fig. 9 the wing 36 is secured with its face 46 flat against its respective wall 24. The weld 42 preferably extends along the top, side and bottom margins of its respective wing 36, thus providing a long line of weld to secure the coupling member to the trough. The weld 43 may extend along each margin of the edge 40 of extension 38, firmly securing it to its respective wall 27. For a purpose to be subsequently set forth the wing 37 is provided with two elongate holes 48 and 49 extending transversally therethrough and having their major axes normal to the wall 24.

As to coupling members 33, at the other end of the trough section, they are similar to coupling members 32 in that each preferably comprises a minor attaching wing or flange 51, and a major outstanding coupling wing or flange 52, the latter having a portion 53 extending below the lower margin 54 of the minor wing and this portion 53 having its rear edge 55 for engagement with its respective wall 27, cut at an angle to the juncture line 56 between the wings 51 and 52. However these coupling members 33 have different relationship to the trough 22 and walls 27 and the last mentioned angle is slightly greater than the angular relationship of edge 40, to juncture line 41, so that when each coupling member 33 is attached to its respective walls 24 and 27 there is a space 58 shown in Figs. 2 and 6, between the inner face 59 and the outer face of the trough wall. Furthermore the wing 51 is attached to its respective wall 24 by a weld 60, preferably extending along its side margin and along most of its upper and lower margins, so that it projects beyond the end 61 of the trough a distance substantially equal to the spacing of the coupling member 32 from the other end of the trough, whereby an upwardly facing slender area 63 of its wing or flange 51 is exposed beyond its respective side wall 24 as shown in Fig. 6. The extension 53 is secured to its respective wall 27 by a weld 64, shown in Figs. 1 and 10. The wings 52 are each preferably provided with two elongate holes 65 and 66, corresponding to holes 48 and 49, and likewise located with their major axes substantially normal to the respective trough wall 24.

Thus it will be observed, the coupling members 32 and 33 may be easily cut from stock angle metal without bending and the various welds will securely fasten them to the parts of the trough and its substructure. It will also be noted that the flanges or wings 51 have a greater angle of divergence than the side walls 24 of the trough as shown in Fig. 2, so that when two trough sections are in end to end relation any mutilation of the trough at the areas 45 whereby it is bent outwardly, will not interfere with the nesting of the end 44 of the trough upon the flanges 51 or the coupling members 33, during assembly of the conveyor.

The flange 34, which is somewhat common in the art, may be secured to the underside of the trough bottom 23 as by weld 68. If desired the ends of flanges 29 may be peened down as indicated at 69, also common in the art, altho this is unnecessary since the skids 30 and 31 afford a degree of protection to such ends which does not exist in connection with trough sections now in common use, where the skids are remote from the end portions of each section.

With reference to the skids 30 and 31 of each trough section, they may be of conventional form, such as those made from tubular stock, each comprising a relatively long, major intermediate portion 71 and short, minor, upturned angular end portions 72.

The skid 30 is preferably secured with its intermediate portion 71 in surface contact with the underside of the flanges 29 as by weld 73 shown in Fig. 3, whereby its lower surface or tread 74 is spaced a uniform distance from the track for the lower run of material moving means 15. The skid 30 is also located in such close proximity to the end of the track as to act as a protective guard against accidental bending thereof during transportation, assembly and dismembering of the conveyor and to also serve as a hand hold or hand bar to be conveniently grasped by a workman during transportation of the section, or pulling or shoving it over the ground, as is obvious from Figs. 4 and 8.

The skid 31 is preferably secured to the flanges 29 thru the interposition of spacers 75 and weld 76, shown in Fig. 3, the spacers engaging the underside of flanges 29 and the upper surface of the intermediate portion 71. This spaces the lower surface or tread 77 of skid 31 a distance from the track for the lower run of material moving means 15 appreciably greater than the above mentioned spacing of tread 74 of skid 30 from the track. The skid 31 is also located in such close proximity to the end of the track as to act as a guard therefore, and to also serve as a hand hold or hand bar like skid 30 as may be observed in Figs. 3 and 4.

This construction and arrangement of skids has added advantages in that when two trough sections are moved into end to end relation there is not enough space between adjacent skids to accommodate one of the flights 19 therebetween, so that workmen cannot leave one of the flights below the track when assembling as is frequently the case where the skids are remote from the ends of the trough sections. Also, the arrangement referred to permits of that which we chose to term "one point support" for each trough section with respect to the ground as may be noted from Figs. 1 and 7. That is, the blocks 13 may be placed beneath the lower skids 31; the skids 30 requiring no such blocks.

If desired the skids 30 may be connected to the lower portions of coupling members 32 by welds 80, and the lower portions of coupling members 33 to skids 31, by welds 81, thus further bracing the structure.

The means 29 for detachably connecting the trough sections by cooperation with the coupling members 32 and 33 is in the nature of hooks, each comprising a shank 82, a bight portion 83 and a bill 84, the shank being provided with a handle 85 preferably at an acute angle to the plane of the hook as shown in Fig. 10. These hooks may be made so that the distance between the free end 86 of the bill and the adjacent portion of the shank 82 is such that when the bill is passed thru the holes 48 and 65 of adjacent wings or flanges 37 and 52 respectively, the bight portion 83 is accommodated in said holes, and the handle 85 acted upon to move the hook to the position shown in Figs. 1 and 10, the hook will draw and hold the trough sections together by frictional engagement of the bill and shank against the exposed faces of the wings or flanges 37 and 52. This makes a quick and sturdy coupling means, and by making the holes 48 and 65 elongate in shape, with the major axis of each normal to the adjacent trough wall 24, if there is any reasonable distortion of the trough due to bending of these walls 24 inwardly or outwardly, there will still be room for accommodation of the bill 84 and bight portion of the hook in the coupling operation. However our invention does not preclude the use of ordinary or approved bolts with nuts as coupling mediums, common in the art and where the companion holes 48 and 65, and 49 and 66 may be used to receive the shanks of such bolts.

There are other advantages for the construction and arrangement of parts of the trough sections herein disclosed. When loading, unloading and carrying the sections which are usually six feet in length, the workmen can grasp the intermediate portion 71 of the skids when lifting and carrying the section, because they are at the ends of the section, and if of round or oval cross section, these intermediate portions may be comfortably grasped, and injuries to the hands of workmen are unlikely to occur. When slid longitudinally, the skids being at the end portions, slide over uneven surfaces of the floor without likelihood of the track or chute rubbing on the floor in contradistinction to trough sections where the skids are located inwardly a considerable distance from the ends. The efficient bracing of the trough, stringers and skids makes possible the use of lighter metal that has been commonly used with a saving in cost and a reduction in the fatigue of workmen employed to assemble, dismember and transport the sections. The arrangement whereby the flanges 51 diverge outwardly and upwardly at a greater angle than the angle of divergence of the trough walls 24 enables quick and proper assembly of the sections in end to end relation. For instance, assuming that a trough section is to be placed in operative relation to the end 61 of a trough already in place, the workman simply lifts the end 44 of the section to be placed so that it is slightly above the flanges 51 of the section to which it is to be coupled and then lowers it so that it rests upon the flange 34 of the section already in place, regardless of the unevenness in the bottom or floor of the room. If it happens that the section thus placed has been bent so that its upper portion of the end thus placed is wider than normal, it will still nest properly because of the characteristics of the flanges 51 with respect to the walls 24 above referred to. It will also be noted that it is not necessary to place a block beneath each adjacent skid when they are above a depression in the floor because of the "one point" support of the sections with respect to the floor.

The importance of the foregoing will be appreciated when it is pointed out that, in all types of mechanical mining, even short periods when the machine is not operating are quite costly. The conveyor delivers coal, for instance, at a maximum rate of one ton per minute; and a crew of as many as a dozen men may be forced into idleness when the conveyor is being partially dismembered and reassembled with additional trough sections and added chain and flights. It is our experience that often six or seven intermediate trough sections are added, in a single seven hour shift, to the length of the conveyor. As soon as a "room" is driven to full length, the trough line must be quickly dismembered for removal and use elsewhere. The very quick addition and removal of the trough sections makes for efficiency and increased output of the crew.

While we have merely shown in the drawings, as to the trough sections, those which are generally known as intermediate sections, it will be apparent that certain characteristics of the invention may be applied to the trough portions of tail and head sections of conveyors, without departing from the spirit of our invention.

We claim:

1. An intermediate section for chain conveyors comprising an elongate trough, spaced apart parallel rails extending longitudinally of and beneath said trough and of a length substantially equal to the length of said trough, to form a track, and a transverse skid carried by each end portion of the track, disposed therebeneath, said skid constructed and arranged in such close proximity to its respective end of the track as to act as a protective guard therefor during transportation and during assembly and dismembering of the conveyor and to serve as a hand bar at the end of the conveyor section to facilitate transportation thereof by workmen.

2. In a conveyor, the combination of means for moving material comprising a continuous chain and flights carried thereby, arranged to provide an upper run, and a lower run; conveyor sections for said means, each section comprising a trough in which said upper run moves, and means below said trough for movably supporting said lower run, said conveyor sections being arranged in end to end meeting relation; means for detachably coupling said sections together; and transverse skids carried by the end portions of said conveyor sections below said last mentioned means, the skids at meeting ends of said conveyor sections being spaced apart a distance less than the width of any one of said flights, thus preventing assembly of the sections with a flight between said skids.

3. In a conveyor, the combination of means for moving material comprising a continuous chain and flights carried thereby, arranged to provide an upper run, and a lower run; conveyor sections for said means, each section comprising a trough in which said upper run moves, a seat at one end of the trough upon which the trough of an adjacent conveyor section rests, and means below said trough for movably supporting said lower run, said conveyor sections being arranged in end to end meeting relation; means for detachably coupling said sections together; and transverse skids carried by the end portions of said conveyor sections below said last mentioned means, the skids at meeting ends of said conveyor sections being arranged so that the bottom of one is in a horizontal plane above the horizontal plane of the bottom of the other, thus permitting support of the adjacent ends of two of said coupled sections thru the lower of said skids and said seat.

4. In a conveyor, the combination of means for moving material comprising a continuous chain and flights carried thereby, arranged to provide an upper run, and a lower run; conveyor sections for said means, each section comprising a trough in which said upper run moves, and means below said trough for movably supporting said lower run, said conveyor sections being arranged in end to end meeting relation; means for detachably coupling said sections together; and transverse skids carried by the end portions of said conveyor sections below said last mentioned means, the skids at meeting ends of said conveyor sections being spaced apart a distance less than the width of any one of said flights, thus preventing assembly of the sections with a flight between said skids, and said skids at the meeting ends of said conveyor sections being also arranged so that the bottom of one is in a horizontal plane above the horizontal plane of the bottom of the other, thus permitting support of the adjacent ends of two of said coupled sections thru the lower of said skids.

5. A conveyor section comprising a sheet metal trough bent to provide a bottom and opposite side walls extending in upwardly diverging relation thereto, and means providing flanges extending along and beyond the ends of said side walls at one end of the trough, said flanges having a greater angle of divergence than said side walls, as and for the purpose set forth.

6. In a conveyor, the combination of companion sections for supporting the load; each section comprising a trough, the side walls of which diverge outwardly and upwardly in angular relation to its bottom, a first pair of elongate upstanding coupling members of angular cross section for one end portion of said trough, the members of said first pair being secured one to the outer face of each wall at that end portion, with its one upright leg secured flat against its respective side wall and its other upright leg outstanding from said wall and spaced a slight distance from the end of the wall whereby a downwardly facing slender area of the side wall is exposed between the end of the trough and coupling member, a second pair of elongate, upstanding coupling members of angular cross section, for the other end portion of said trough, the members of said second pair being secured one to the outer face of each wall at said last mentioned end portion, with its one upright leg secured to its respective side wall, but extending beyond the end thereof a distance substantially equal to said first mentioned spacing whereby an upwardly facing slender area of its said leg is exposed beyond its respective side wall, and its other upright leg outstanding from said extending portion, the securing legs of said second pair of coupling members being disposed in greater angular diverging relation, upwardly and outwardly from the trough bottom than said side walls, whereby, when two of said load supporting sections are arranged in end to end relation, the said downwardly facing areas of the side walls at the end of one of the sections will confront the said upwardly facing areas of the coupling members at the end of one of the other sections, and means for coupling said sections together at said outstanding legs of the coupling members.

7. In a conveyor, the combination of companion sections for supporting the load; each section comprising a trough, the side walls of which diverge outwardly and upwardly in angular relation to its bottom, a first pair of elongate upstanding coupling members of angular cross section for one end portion of said trough, the members of said first pair being secured one to the outer face of each wall at that end portion, with its one upright leg secured flat against its respective side wall and its other upright leg outstanding from said wall and spaced a slight distance from the end of the wall whereby a downwardly facing slender area of the side wall is exposed between the end of the trough and the coupling member, a second pair of elongate, upstanding coupling members of angular cross section, for the other end portion of said trough, the members of said second pair being secured one to the outer face of each wall at said last mentioned end portion, with its one upright leg secured to its respective side wall, but extending beyond the end thereof a distance substantially equal to said first mentioned spacing whereby an upwardly facing slender area of its said leg is exposed beyond its respective side wall, and its other upright leg outstanding from said extending portion, the securing legs of said second pair of coupling members being disposed in greater angular diverging relation, upwardly and outwardly from the trough bottom than said side walls, whereby, when two of said load supporting sections are arranged in end to end relation, the said downwardly facing areas of the side walls at the end of one of the sections will confront the said upwardly facing areas of the coupling members at the end of one of the other sections, but in spaced relation, and said outstanding legs each provided with an elongate transverse hole with its major axis extending normal to its respective trough side wall, and detachable fastening devices extending thru the said holes of adjacent outstanding legs of the coupling members.

8. In a section for endless chain conveyors, the combination of an elongate trough, for supporting the upper run of the chain, including a bottom and a side wall extending upwardly and outwardly in angular relation to said bottom; track means, for supporting the lower run of the chain beneath said trough, including a side wall extending longitudinally of the trough and secured thereto adjacent the juncture between the bottom and side wall of the trough; and an elongate, upstanding brace for said walls, of generally right angular cross section, comprising a minor wing secured to said wall of the trough with its one flat face in confronting relation thereto, and a major wing in right angular outstanding relation to said minor wing, with a portion extending below the lower margin of the latter, the last mentioned portion having its inner edge engaging and secured to the wall of said track means.

9. In a section for endless chain conveyors, the combination of an elongate trough, for supporting the upper run of the chain, including a bottom and a side wall extending upwardly and outwardly in angular relation to said bottom; track means, for supporting the lower run of the chain beneath said trough, including a side wall extending longitudinally of the trough and secured thereto beneath said wall of the trough, an elongate, upstanding brace for said walls of generally right angular cross section, comprising a minor wing with its one flat face in confronting relation to said wall of the trough, and a major wing in right angular outstanding relation to said minor wing, with a portion extending below the lower margin of the latter, said last mentioned portion having its inner edge engaging the wall of said track means, a weld extending at least along one margin and the bottom of said minor wing securing it to said wall of said trough, and a weld extending along said edge of the major wing, securing it to the wall of said track means.

10. In a conveyor, the combination of a continuous chain, arranged to provide an upper run and a lower run; flights carried by said chain in spaced relation longitudinally thereof, said flights extending laterally of each side of the axis of the chain; conveyor sections for supporting said chain and flights, each conveyor section comprising an elongate trough in which said upper run and its flights move, and spaced apart rails extending longitudinally of and below said trough, upon which the end portions of the flights of the lower run ride, said conveyor sections being arranged with their respective troughs and rails in end to end relation; and a skid at each end portion of each of said conveyor sections, secured to the under sides and transversally of the rails thereof and constructed and arranged in such close proximity to the ends of the rails as to act as a protective guard against accidental bending thereof during transportation, assembly and dismembering of the conveyor and to serve as a hand bar at the end of the conveyor section to facilitate transportation thereof by workmen.

11. An intermediate section for chain conveyors comprising an elongate trough having a seat at one end portion for reception of the end portion of a companion trough section, spaced apart parallel rails extending longitudinally of and beneath said trough and of a length substantially equal to the length of said trough, to form a track, and a transverse skid carried by each end portion of the track, disposed therebeneath, in such close proximity to its respective end of the track as to act as a guard therefor during transportation, and during assembly and dismembering of the conveyor, said skid adjacent said seat constructed and arranged so that its lower surface is spaced a distance below said track appreciably greater than the spacing of the lower surface of the other skid below said track, as and for the purpose set forth.

12. An intermediate section for chain conveyors comprising an elongate trough having a seat at one end portion for reception of the end portion of a companion trough section, spaced apart parallel rails extending longitudinally of and beneath said trough and of a length substantially equal to the length of said trough to form a track, and a transverse skid carried by each end portion of the track, disposed therebeneath, said skid adjacent said seat constructed and arranged so that its lower surface is spaced a distance below said track appreciably greater then the spacing of the lower surface of the other skid below said track, as and for the purpose set forth.

13. In a section for a chain conveyor of the type including a continuous chain, having upper and lower runs, and flights carried by and extending laterally of the chain, the combination of a trough comprising a bottom upon which the upper run of the chain conveyor travels, and opposite side walls, a pair of rails beneath and paralleling said trough, upon which the flights of the lower run of the chain conveyor travel, a skid secured to said rails, transversally thereof adjacent their ends, and having portions extending beyond the outer sides of said rails, and a pair of braces, there being one of said braces secured to each side of the conveyor section constructed and arranged for coupling relation with a companion conveyor section, each of said braces including a vertical flange outstanding and normal to its respective side wall of the conveyor section and secured to its respective side wall, the adjacent rail and its adjacent extending portion of the skid, whereby the braces strengthen the trough and secure the rails thereto, and the braces are strengthened by their connections with the extending portions of the skid.

ARMISTEAD R. LONG.
JOHN B. LONG.

REFERENCES CITED

The following references are of record in the file of this patent:

UNITED STATES PATENTS

| Number | Name | Date |
|---|---|---|
| 2,016,994 | Fleming | Oct. 8, 1935 |
| 1,854,351 | Suppes | Apr. 19, 1932 |
| 796,498 | Claghorn | Aug. 8, 1905 |
| 1,355,308 | Brown | Oct. 12, 1920 |
| 1,922,972 | Miller | Aug. 15, 1933 |
| 1,627,354 | Thorsten | May 3, 1927 |